United States Patent [19]

van Konynenburg et al.

[11] Patent Number: 4,534,889

[45] Date of Patent: Aug. 13, 1985

[54] PTC COMPOSITIONS AND DEVICES COMPRISING THEM

[75] Inventors: Peter H. van Konynenburg, Mountain View; Bernard J. Lyons, Atherton; Robert Smith-Johannsen, Portola Valley; Wendell W. Moyer, Atherton, all of Calif.

[73] Assignee: Raychem Corporation, Menlo Park, Calif.

[21] Appl. No.: 468,768

[22] Filed: Feb. 22, 1983

Related U.S. Application Data

[63] Continuation of Ser. No. 329,589, Dec. 10, 1981, abandoned, which is a continuation of Ser. No. 969,928, Dec. 15, 1978, abandoned, which is a continuation of Ser. No. 900,907, Apr. 28, 1978, abandoned, which is a continuation of Ser. No. 732,792, Oct. 15, 1976, abandoned.

[51] Int. Cl.$^3$ .............................................. H01B 1/06
[52] U.S. Cl. ............................... 252/511; 204/159.11; 204/159.13; 524/495; 524/496
[58] Field of Search ...................... 252/511, 512, 518; 204/159.13, 159.11; 524/495, 496, 492, 588

[56] References Cited

U.S. PATENT DOCUMENTS

| | | | |
|---|---|---|---|
| 2,763,609 | 9/1956 | Lewis et al. | 204/154 |
| 3,412,358 | 11/1968 | Hummel et al. | 338/7 |
| 3,547,834 | 12/1970 | Oshima et al. | 252/511 |
| 3,658,750 | 4/1972 | Tsukui et al. | 260/38 |
| 3,689,618 | 9/1972 | Chadwick | 264/104 |
| 3,757,088 | 9/1973 | Osborn | 219/553 |
| 3,914,363 | 10/1975 | Bedard et al. | 264/105 |
| 3,929,718 | 12/1975 | Kratel | 260/37 |
| 4,062,813 | 12/1977 | Andrianov et al. | 252/511 |

FOREIGN PATENT DOCUMENTS

| | | |
|---|---|---|
| 151251 | 12/1975 | Japan . |
| 39742 | 4/1976 | Japan . |
| 39743 | 4/1976 | Japan . |

OTHER PUBLICATIONS

Kautschuk v. Gummi, II, WT 138–148 (1958), de Meij (including translation).
601639, 8-4-75, Horsma et al.
Brit. J. Appl. Phys. (J. Phys D) 1969, Ser. 2, vol. 2, 567–576 (1969), Carley Read et al.
Koll. Zh. 14 (No. 5), 346 (Dogadkin et al.).
Soviet Plastics, No. 4 (1967), pp. 46–49 (Galkina et al.).

*Primary Examiner*—Josephine L. Barr
*Attorney, Agent, or Firm*—Timothy H. P. Richardson; Herbert G. Burkard

[57] ABSTRACT

Novel conductive polymer compositions which exhibit useful PTC behavior are produced by cross-linking processes. By correlating the polymer, the conductive filler dispersed therein, and the cross-linking conditions, PTC compositions having desired resistance/temperature characteristics can be prepared. In particular the cross-linking can be carried out so as to provide compositions having a switching temperature around the cross-linking temperature. The invention is applicable to both elastomeric and thermoplastic polymers, and provides for the first time a method of making PTC compositions exhibiting useful PTC behavior from elastomers.

43 Claims, 3 Drawing Figures

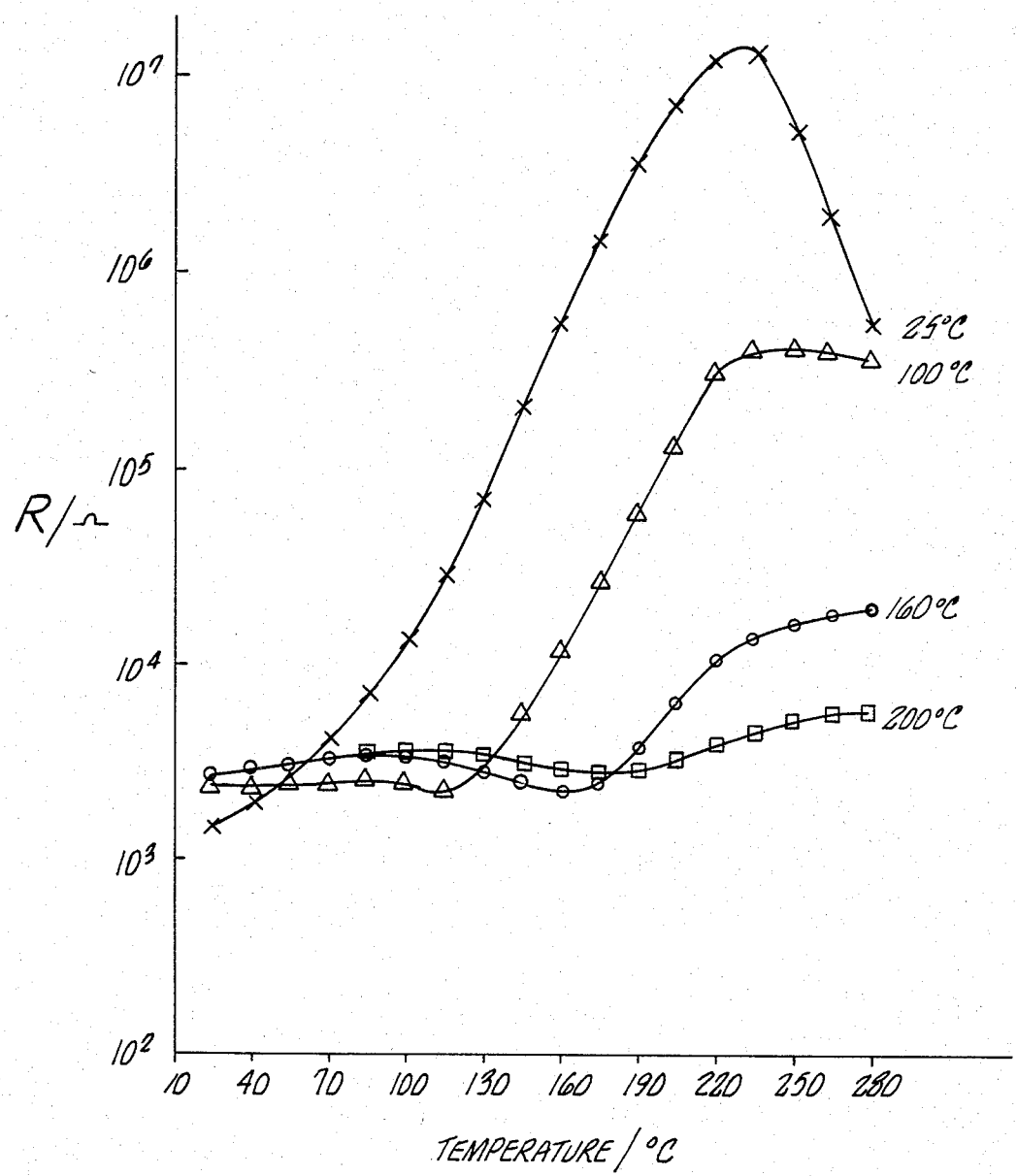

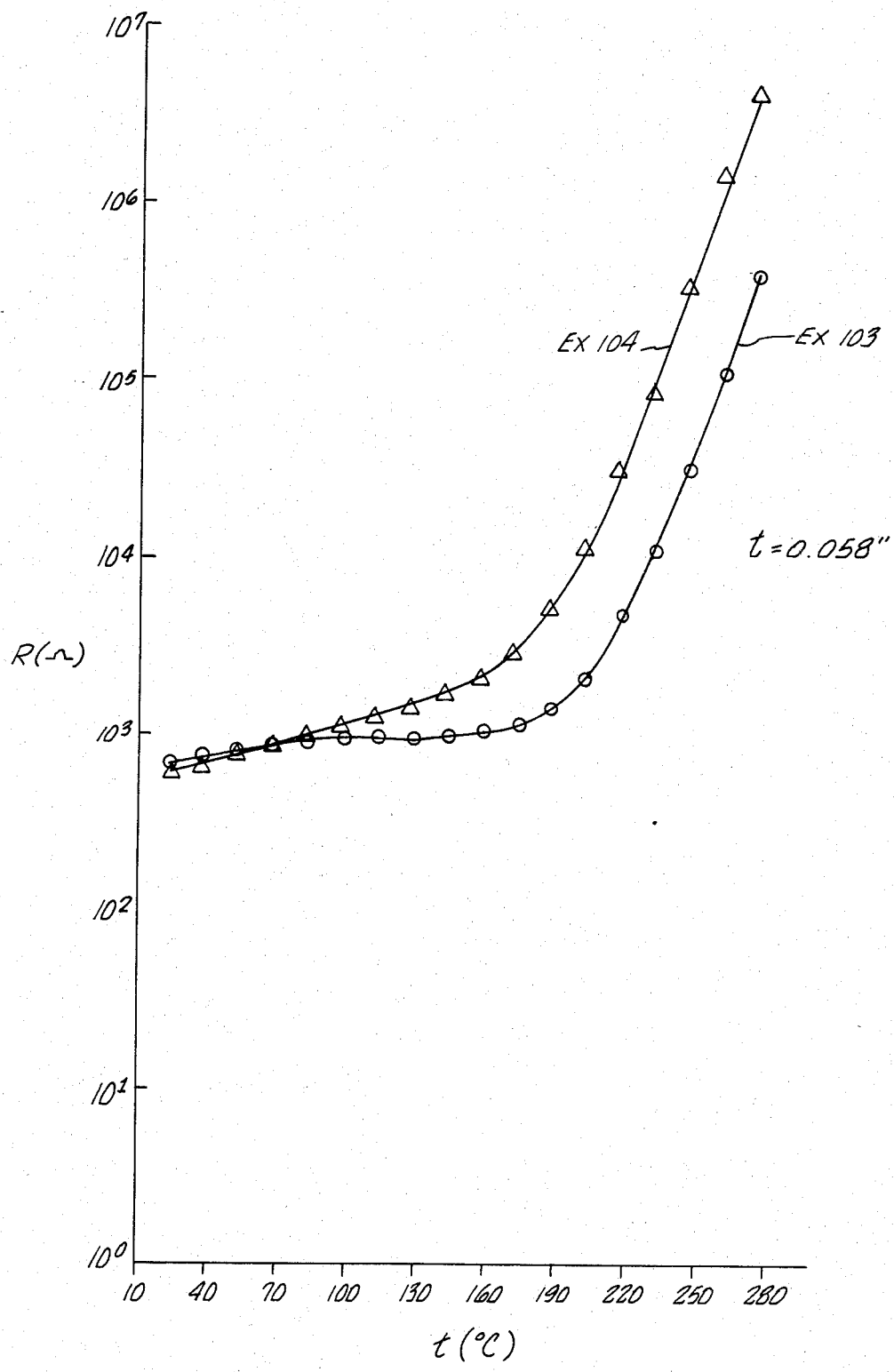

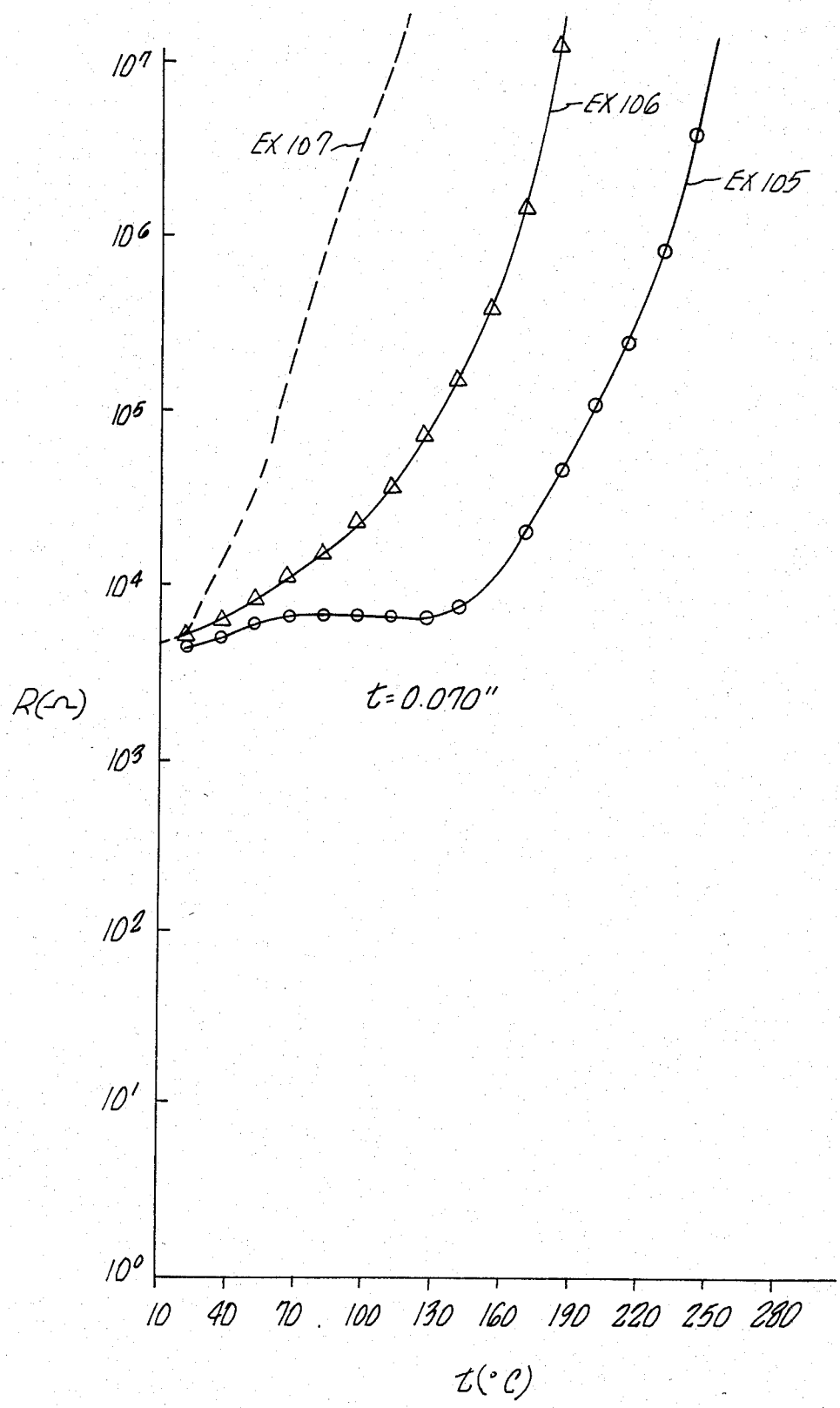

PTC COMPOSITIONS AND DEVICES COMPRISING THEM

CROSS-REFERENCES TO RELATED APPLICATIONS

This application is a continuation of U.S. Ser. No. 329,589, filed Dec. 10, 1981, which is a continuation of U.S. Ser. No. 969,928, filed Dec. 15, 1978, which is a continuation of U.S. Ser. No. 900,907, filed Apr. 28, 1978, which is a continuation of U.S. Ser. No. 732,792, filed Oct. 15, 1976 all abandoned.

BACKGROUND OF THE INVENTION

1. Field of the Invention

This invention relates to conductive polymer compositions which exhibit PTC characteristics, and to devices comprising such compositions.

2. Summary of the Prior Art

It is known that polymers, including natural rubbers and other elastomers, can be made electrically conductive by dispersing therein suitable amounts of finely divided conductive fillers, e.g. carbon black. For a general survey of such materials (which are usually known as conductive polymers), reference may be made to "Conductive Rubbers and Plastics" by R. H. Norman, published in 1970 by Elsevier Publishing Co. It is also known that the electrical properties of conductive polymers frequently depend upon, inter alia, their temperature; and that a very small proportion of conductive polymers exhibit what is known as PTC (positive temperature coefficient) behavior, i.e., a rapid increase in resistivity at a particular temperature or over a particular temperature range. The term "switching temperature" (usually abbreviated to $T_s$) is used to denote the temperature at which the rapid increase takes place. When the increase takes place over a temperature range (as is often the case) then $T_s$ can conveniently be designated as the temperature at which extensions of the substantially straight portions of the plot of the log of the resistance against the temperature (above and below the range) cross. The resistance of PTC polymers continues to increase as the temperature rises above $T_s$ until it reaches a maximum, called the Peak Resistance, at a temperature which is called the Peak Temperature; the resistance thereafter decreases more or less rapidly.

Materials exhibiting PTC behavior are useful in a number of applications in which the size of the current passing through a circuit is controlled by the temperature of a PTC element forming part of that circuit. For practical purposes this means that the $T_s$ of the material should lie between about $-100°$ C. and about $250°$ C. and that the volume resistivity of the material at temperatures below $T_s$ should be from about 25 to about $10^5$ ohm cm. The lower limit on resistivity results from the requirement that, at temperatures above $T_s$, the PTC element should be an insulator; if the resistivity of the element below $T_s$ is less than 25 ohm. cm., then even after the increase in resistivity around and above $T_s$, the resistivity will not be sufficiently high. The upper limit on resistivity results from the requirement that the PTC element should be a conductor at temperatures below $T_s$. The practical effect of these limitations on resistivity is to exclude from consideration conductive polymers having either very high or very low loadings of conductive filler. Another practical requirement for PTC materials is that the increase in resistance above $T_s$ should be sufficiently high that the heater (or other device) is effectively converted from an electrical conductor to an electrical insulator by a relatively limited increase in temperature. A convenient expression of this requirement is that the material should have an $R_{14}$ value of at least 2.5 or an $R_{100}$ value of at least 10, and respectively an $R_{30}$ value of at least 6 where $R_{14}$ is the ratio of 10 resistivities at the end and beginning of the $14°$ C. range showing the sharpest increase in resistivity; $R_{100}$ is the ratio of the resistivities at the end and beginning of the $100°$ C. range showing the sharpest increase in resistivity; and $R_{30}$ is the ratio of the resistivities at the end and beginning of the $30°$ C. range showing the sharpest increase in resistivity. A further practical requirement for most PTC materials is that they should continue to exhibit useful PTC behavior, with $T_s$ remaining substantially unchanged, when repeatedly subjected to thermal cycling which comprises heating the material from a temperature below $T_s$ to a temperature above $T_s$ but below the peak temperature, followed by cooling to a temperature below $T_s$. It is also preferred that the ratio of the peak resistance to the resistance at $T_s$ should be at least 20:1, especially at least 100:1. It is further preferred that when $T_s$ is less than $150°$ C. the ratio of the resistance to the resistance at $T_s$ should be at least 20:1 at $200°$ C.; and then $T_s$ is greater than $150°$ C., this ratio should be at least 20:1 at $250°$ C.

Having regard to these practical limitations, it has been accepted in the art that in a conductive polymer composition exhibiting useful PTC behavior, the polymer must be a thermoplastic crystalline polymer, and that amorphous polymers are unsatisfactory for this purpose—see for example the article by J. Meyer in Polymer Engineering and Science, November 1973, 13, No. 6, pages 462–468. Thus PTC compositions comprising a thermoplastic crystalline polymer with carbon black dispersed therein have been widely used in self-regulating strip heaters. Such a composition shows a rapid increase in resistance over a range which begins at the softening point of the polymer and has a $T_s$ at or near the crystalline melting point of the polymer; the greater the crystallinity of the polymer, the smaller the temperature range over which the resistance increase takes place. Generally, the composition is cross-linked to improve its stability at temperatures above $T_s$, and when this has been done in the past, the cross-linking has been effected by irradiation at room temperature, the polymer reaching a temperature of at most $45°$ C.

PTC conductive polymer compositions in which the polymer is a thermoplastic crystalline polymer are very satisfactory for many purposes. However, it is a serious disadvantage that the $T_s$ and the physical properties of such compositions are governed by the polymer employed.

Although, as noted above, it has been accepted in the art that in conductive polymer compositions exhibiting useful PTC behavior, the polymer must be a thermoplastic crystalline polymer; there have been prior disclosures, usually in patent specifications, of PTC compositions in which the filler is dispersed in an amorphous thermoplastic polymer; and in which a filler is dispersed in a thermoset material; and in which a thermoplastic having the filler dispersed therein is distributed throughout another polymer which may be a thermoplastic, a synthetic or natural rubber, or a thermoset resin; and in which a conductive filler is dispersed in an elastomer. In many of these disclosures, it is clear that in all the compositions actually studied, the conductive filler was dispersed in a crystalline polymer, and that the $T_s$ of the composition was governed by the melting point of that polymer. In the few cases in which it appears that a conductive filler was dispersed in a non-crystalline polymer to prepare a PTC composition, the precise preparative details are often not clear enough to enable substantially similar compositions to be prepared independently; however, it does appear that in all such cases the compositions failed to exhibit useful PTC behavior as defined above and that the $T_s$ of the composition (if any) was associated with a thermodynamic transition point of the polymer or with the breaking of thermally labile bonds in the polymer.

For details of the prior disclosures referred to in the preceding paragraph, and of the conventional compositions comprising thermoplastic crystalline polymers, reference should be made to U.S. Pat. Nos. 2,978,665; 3,243,753; 3,412,358; 3,591,526; 3,793,716; 3,823,217; and 3,914,363; British Pat. No. 1,409,695; Brit. J. Appl. Phys, Series 2, 2, 567–576 (1969, Carley Read and Stow); and Kautschuk und Gummi II WT 138–148 (1958, de Meij); as well as the Meyer article referred to above, the disclosures of which are hereby incorporated by reference. For details of recent developments in this field, reference may be made to U.S. patent applications Ser. Nos. 601,638 (now U.S. Pat. No. 4,177,376), 601,427 (now U.S. Pat. No. 4,017,715), 601,639 (abandoned Oct. 30, 1979, continuation U.S. Ser. No. 84,352, now pending), 601,549 (now abandoned), and 601,344 (now U.S. Pat. No. 4,085,286) (all filed Aug. 4, 1975), 638,440 (now abandoned) and 638,687 (now abandoned) (both filed Dec. 8, 1975) and the application, having Ser. No. 706,602, (now abandoned) filed July 19, 1976 by Kamth and Leder and entitled "Improved PTC Strip Heaters", the disclosures of which are hereby incorporated by reference.

There are many uses for conductive polymers for which PTC behavior is of no significance, or at least of no recognised significance, and in many of them, e.g., the prevention of static charges in floor coverings, etc., the conductive polymer is not in contact with an electrode. Many different conductive polymers have been proposed for such uses, for example natural rubbers, which may be sulfur-cured after incorporation of the conductive filler. In some cases particular polymers are in practice invariably used with particular conductive fillers and cured in particular ways. For example, polysiloxanes are in practice invariably rendered conductive by incorporation of acetylene black and peroxide-cured at relatively high temperatures, e.g., 170°–180° C.

As will further be made clear hereinafter, a very careful selection and combination of features is needed in order to obtain a useful PTC composition in which the filler is dispersed in a crosslinked elastomer, and so far as we are aware, useful PTC behavior is not an inherent property of any of the many conductive cross-linked elastomers which are known for uses in which PTC behavior is of no significance, or at least of no recognised significance.

SUMMARY OF THE INVENTION

We have now discovered that compositions exhibiting useful PTC behavior can be prepared by dispersing conductive particles in an amorphous polymer and cross-linking the resulting dispersion. We have further discovered that, provided a sufficient degree of cross-linking is introduced, the cross-linking of any conductive polymer (whether crystalline or amorphous, and whether previously cross-linked or not) will have a substantial effect on the resistance/temperature characteristics of the composition at a temperature which is related to the cross-linking temperature (which is frequently referred to herein as $T_c$). Thus such cross-linking frequently will cause the composition to exhibit useful PTC behavior with a $T_s$ around $T_c$ or will enhance previously existing useful PTC behavior around $T_c$. We have also found that the relation between $T_c$ and the temperature range over which the effect (on resistance/temperature characteristics) is chiefly observed is at least in part dependent on the arrangement of the polymer chains at the time at which they are cross-linked. For example, if a polymer having high green strength is annealed at one temperature and is then heated (or cooled) to another temperature, both temperatures being above the melting point, and immediately cross-linked to an adequate extent, a useful effect will be observed commencing at a temperature between the annealing temperature and $T_c$. On the other hand if the polymer has low green strength, the effect will commence near $T_c$. For crystalline polymers which are cross-linked at temperatures within the melting range, and which have preferably been allowed to equilibrate at $T_c$ prior to cross-linking, different effects will be observed depending upon whether $T_c$ is below or above about the peak of the crystalline melting range. Yet different effects will be observed for crystalline polymers which are cross-linked above the crystalline melting point. We have also found that if a PTC composition is produced by a process which comprises two cross-linking steps carried out at different temperatures, the resistance temperature characteristics can reflect either one or both of the cross-linking steps.

From the foregoing it will be clear that the present invention provides a novel method of making PTC compositions having resistance/temperature characteristics which are not solely determined by the ingredients of the composition but can be predictably controlled by the method of preparation. In particular it is possible to prepare PTC compositions which (a) have a $T_s$ which is not associated with a thermodynamic transition of the polymer, e.g. the glass transition point or the crystalline melting point, or with chemical instability, including for example, a lessening of the rigidity of the cross-linked network above a certain temperature due to the lability of the cross-links above that temperature, e.g. the lability of disulfide links above about 70° C.; or (b) exhibit PTC behavior over two distinct temperature ranges; or (c) have a $T_s$ which is associated with a thermodynamic transition of the polymer (as is shown) but show higher values of $R_{14}$, $R_{100}$ or $R_{30}$ than have hitherto been attained with the same polymer and same conductive filler.

In its broadest product aspect the present invention provides any PTC composition which is novel and which comprises
  (1) a cross-linked polymer; and
  (2) conductive particles enclosed within the cross-linked network of said polymer, the particles having a size of at least 18 millimicrons;
which composition
  (a) has a gel fraction of at least 0.6;
  (b) exhibits PTC behavior with an $R_{14}$ value of at least 2.5 or an $R_{100}$ value of at least 10, and at least one $T_s$ within the temperature range of $-100°$ to $+250°$ C.; and (c) has a volume resistivity at temperatures below said $T_s$ between 25 and $10^5$ ohm·cm.

In these compositions the cross-linked polymer can be a mixture of cross-linked polymers and the composition may include other components such as fillers, flame retardants and antioxidants, as well as other cross-linked polymers not having conductive particles enclosed within the cross-linked network thereof, and thermoplastic amorphous or crystalline polymers which may or may not have conductive particles mixed therewith. Such compositions are novel when the cross-linked polymer comprises an elastomer. They are also novel when the crosslinked polymer comprises a cross-linked crystalline polymer and the composition has a $T_s$ which is above the $T_s$ of the composition prior to cross-linking.

It its broadest process aspect the present invention provides any process which is novel and which comprises:

(1) dispersing conductive particles having a size of at least 18 millimicrons in a polymer; and
(2) cross-linking the dispersion from step (1) to obtain a composition having a gel fraction of at least 0.6; the particles, the polymer, and the cross-linking conditions being such that the cross-linked composition
 (a) exhibits PTC behavior with an $R_{14}$ value of at least 2.5 or an $R_{100}$ value of at least 10, and at least one $T_s$ within the temperature range of $-100°$ C. to $+250°$ C.; and
 (b) has a volume resistivity at temperatures below $T_s$ of 25 to $10^5$ ohm·cm.

In these processes, the conductive particles can be dispersed in a mixture of polymers. Such processes are novel when the polymer comprises an amorphous polymer and the cross-linked composition comprises conductive particles enclosed within the cross-linked network of the amorphous polymer. They are also novel when the polymer comprises a crystalline polymer and the cross-linking is effected at a temperature above 60° C., preferably above the $T_s$ of the composition prior to cross-linking, preferably under conditions such that the cross-linked composition
 (a) exhibits PTC behavior with a first $T_s$ ($T_{s1}$) near the crystalline melting point of the polymer and a second $T_s$ ($T_{s2}$) near the temperature of the cross-linking step;
 (b) has a volume resistivity at temperatures below the lower of $T_{s1}$ and $T_{s2}$ of 25 to $10^5$ ohm·cm; and
 (c) has an $R_{14}$ value between $T_{s1}$ and $T_{s2}$ or above the higher of $T_{s1}$ and $T_{s2}$ of at least 2.5 or has an $R_{100}$ value between $T_{s1}$ and $T_{s2}$ or above the higher of $T_{s1}$ and $T_{s2}$ of at least 10.

Such processes are also novel when the cross-linking is effected in two stages carried out at substantially different temperatures. When the polymer is a thermoplastic it is usually preferable that the first cross-linking should be effected at lower temperature than the second. When the cross-linked polymer is an elastomer it is generally preferable the first cross-linking should be effected at a higher temperature than the second.

BRIEF DESCRIPTION OF THE DRAWINGS

The invention is illustrated by the accompanying drawings, in which the Figures show the relation between resistance and temperature of various PTC compositions according to the invention, as further described in the Examples below.

FIG. 1 is a graph showing the variation in resistance with temperature of a composition cured at 25° C., 100° C., 150° C. and 200° C. in accordance with Examples 67-70.

FIG. 2 is a graph showing the variation in resistance with temperature of the compositions of Examples 103 and 104.

FIG. 3 is a graph showing the variation in resistance with temperature of the compositions of Examples 105, 106 and 107.

DESCRIPTION OF THE PREFERRED EMBODIMENTS OF THE INVENTION

Care is needed in the selection of the conductive filler, the polymer in which it is dispersed, and the cross-linking conditions, in order to ensure that a PTC composition having the desired characteristics is obtained. However, those skilled in the art will have no difficulty, having regard to the disclosure herein and their own knowledge, in making and using the invention and obtaining the advantages thereof.

Choice of Conductive Filler

We have found that conductive filler must have a particle size of at least 18 millimicrons, in order for a useful PTC effect to be obtained. As the particle size increases, the PTC behavior tends to become more pronounced. However, this valuable effect is counter balanced by the need to include greater proportions by weight of the larger-sized fillers to obtain the same resistivity. This does not put any very serious upper limit on the size of highly conductive fillers, e.g. metal particles, which may have sizes up to or even more than 1 micron. However, when using conductive carbon blacks, as is preferred, it is very difficult to achieve satisfactory physical properties when using particle sizes greater than 100 millimicrons, because of the high proportions of carbon black needed to obtain the required resistivity. It is preferred that the carbon blacks used in this invention should have a maximum size of 80 millimicrons.

As is well known in the art, carbon blacks are conventionally characterised by their particle size and by their nitrogen absorption and DBP (dibutyl phthalate) absorption values, which provide a measure of the porosity and aggregation of the primary particles. For details of these characteristics and their measurement, see for example "Analysis of Carbon Black", by Schubert, Ford and Lyon, in volume 8, at page 179, of Encyclopedia of Industrial Chemical Analysis (1969) published by John Wiley & Son, New York.

The preferred particle size of the carbon black is also dependent on the cross-linking temperature ($T_c$). As $T_c$ increases, PTC behavior tends to become less pronounced, but this can be offset by an increase in the particle size of the carbon black. Thus it is preferred that the particle size should be at least 20 millimicrons when $T_c$ is above 20° C., at least 30 millimicrons when $T_c$ is above 100° C., and at least 40 millimicrons when $T_c$ is above 150° C.

A large variety of carbon blacks are commercially available, but only a small proportion of them are known as conductive blacks and recommended for use in conductive polymer compositions; and many of these are not satisfactory for use in this invention. The preferred types of black for this invention are furnace and acetylene blacks, but the less conductive thermal and channel process blacks can also be used.

Examples of other conductive fillers, in addition to carbon black, are graphite, metal powders, conductive metal salts and oxides, and boron- or phosphorus-doped silicon or germanium.

The choice of a particular filler will in addition be influenced by the polymer to be used, in particular the compatibility of the filler and polymer.

Choice of Polymer

As noted previously, the invention is useful with elastomers and thermoplastic polymers. The effect produced on a composition which already shows pronounced PTC behavior (e.g. one based on a crystalline polymer) will be relatively small, and generally will at most modify, and not remove an existing $T_s$, but will rather modify the characteristic around and above $T_c$ and may even create a second PTC region having a second $T_s$). While such an effect is very valuable, we believe that the invention is even more useful when the cross-linked polymer is an elastomer, because of the variety of physical properties then available, coupled with the ability to vary the $T_s$ of the composition in a predictable way. The cross-linked polymer should preferably be substantially free of carbon-carbon unsaturation, e.g. less than 5% molar concentration (C=C).

Suitable polymers in which the filler can be dispersed prior to cross-linking, and which are converted to elastomers by the crosslinking, include rubbers, elastomeric gums and thermoplastic elastomers. The terms "elastomeric gum", "gum" and "gum stock" are used herein to denote a polymer which is non-crystalline and has a glass transition temperature below $T_c$ and preferably below room temperature (20° C.), and which exhibits rubbery or elastomeric characteristics after being cross-linked. The term "thermoplastic elastomer" is used herein to denote a material which, although not cross-linked, yet exhibits, in a certain temperature range, at least some elastomeric properties; such materials generally contain thermoplastic and elastomeric moieties.

We have found that the higher the green strength of the polymer, the more pronounced the PTC effect (other things being equal). On the other hand, as previously indicated, it may be desirable to anneal polymers having high green strength at or near $T_c$ prior to cross-linking. Depending on the circumstances, therefore, it may be preferred to employ a polymer having low green strength, or a polymer having high green strength. The term "polymer having high green strength" is well known in the art and denotes a polymer which exhibits a tensile stress of at least 10 psi at 20% elongation. Such polymers after being equilibrated at elevated temperature to the configuration favored at that temperature, will not change, or will change only very slowly, from this configuration, when cooled to room temperature. They also posess form stability at room temperature such that articles prepared from them do not distort or flow to any significant extent, even though not cross-linked. Commercially available gums all posess either no significant green strength or substantial green strength.

Suitable gums for use in the invention include polyisoprene (both natural and synthetic), ethylene-propylene random copolymers, polyisobutylene, styrene-butadiene random copolymer rubbers, styrene-acrylonitrile-butadiene terpolymer rubbers with and without added minor copolymerized amounts of $\alpha,\beta$-unsaturated carboxylic acids, polyacrylate rubbers, polyurethane gums, random copolymers of vinylidene fluoride and, for example, hexafluoropropylene, polychloroprene, chlorinated polyethylene, chlorosulphonated polyethylene, poly ethers, plasticized polyvinyl chloride containing more than 21% plasticizer, substantially non crystalline random co- or ter-polymers of ethylene with vinyl esters or acids and esters of $\alpha,\beta$-unsaturated acids, and silicone gums and base polymers, for example polydimethyl siloxane, poly methylphenyl siloxane and poly dimethyl vinyl diloxanes. The silicone gums and base polymers, which are particularly useful starting materials, have substantially no green strength.

Thermoplastic elastomers suitable for use in the invention, include graft and block copolymers such as:
  (i) random copolymers of ethylene and propylene grafted with polyethylene or polypropylene side chains,
  (ii) Block copolymers of $\alpha$-olefins such as polyethylene or polypropylene with ethylene/propylene or ethylene/propylene/diene rubbers, polystyrene with polybutadiene, polystyrene with polyisoprene, polystyrene with ethylene-propylene rubber, poly vinylcyclohexane with ethylenepropylene rubber, poly $\alpha$-methylstyrene with polysiloxanes, poly-carbonates with polysiloxanes, poly(tetramethylene terephthalate) with poly-(tetramethylene oxide) and thermoplastic polyurethane rubbers.

Thermoplastic polymers suitable for use in the invention, which may be crystalline or non-crystalline, include:
  (i) Polyolefins such as polyethylene, polypropylene.
  (ii) Thermoplastic copolymers of olefins such as ethylene, propylene, with each other and with other monomers such as vinyl esters, acids or esters of $\alpha,\beta$-unsaturated organic acids.
  (iii) Halogenated vinyl or vinylidene polymers such as those derived from vinyl chloride, vinylidene chloride, vinyl fluoride, vinylidene fluoride and copolymers thereof with each other or with other halogenated or other unsaturated monomers.
  (iv) Polyesters both aliphatic and partially or wholly aromatic such as poly(hexamethylene adipate) or sebacate, poly(ethylene terephthalate) and poly(tetramethylene terephalate).
  (v) Polyamides such as Nylon-6, Nylon-6,6, Nylon-6,10 and the "Versamids" (condensation products of dimerized and trimerized unsaturated fatty acids, in particular linoleic acid with polyamines).
  (vi) Other materials such as polystyrene, polyacrylonitrile, thermoplastic silicone resins, thermoplastic polyethers, thermoplastic modified celluloses, and polysulphones.

Choice of cross-linking conditions

As noted previously, both $T_c$ and the extent to which crosslinking is effected are extremely important in determining the resistance/temperature characteristics imparted to the composition. $T_c$ not only plays a major role in determining $T_s$, but in addition the higher $T_c$, the less the degree of PTC exhibited (i.e. its slope and magnitude), other things being equal. Thus a carbon black/polymer combination which shows good PTC behavior due to the cross-linking when cross-linked at room temperature may show little or no PTC behavior due to the cross-linking when cross-linked at, for example, 170° C. The inhibiting effect of increasing $T_c$ can often be counteracted by using a carbon black having a larger particle size and/or by increasing the level of cross-linking. We have found that it is essential that the cross-linked polymer have a gel fraction of at least 0.6, and often a higher gel fraction is necessary, e.g. at least 0.75. For most polymers the gel fraction should generally not exceed 0.96, but polysiloxanes and many unsaturated rubbers for example can be cross-linked to higher gel fractions without undesirably affecting the physical properties of the composition.

The crosslinks formed in the cross-linking operation should be stable in the temperature range in which the PTC composition is required to operate. Suitable covalent crosslinks include simple covalent bonds and cross-links comprising one or more of the linking structures

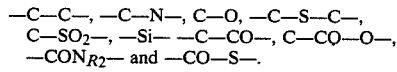

Ionic cross-links are also suitable provided that the composition exhibits form stability at least in the range in which PTC behavior is desired. Thus carboxylated elastomers partially or completely neutralized by sodium may be useful in the range up to 100° C. However, for most applications the more thermally form-stable compositions, which are partially or completely neutralized by di- or polyvalent metal ions, are preferred.

In considering the above discussion those skilled in the art will readily understand that it is possible for polymer molecules to become linked together through mutual attachment to a third body for example, by chemical or strong physical bonding to the surface of the conductive filler, especially carbon black. Thus, the term crosslinking as used in this specification connotes any means of forming bonds between polymer molecules both directly or through the mediation of another small or large molecule or solid body provided only that such bonds result in coherency of the article and a degree of form stability throughout the operating or service temperature range of the composition.

When covalent crosslinking is contemplated, any crosslinking process which will yield a form stable product in the temperature range of utility is suitable. Thus crosslinking may be accomplished by irradiation or by chemical treatments. Suitable chemical crosslinking agents include but are not limited to organic peroxides and other precursor materials capable of yielding free radicals on the application of heat or other activation means, for example metal oxides and amines, or suitable reactive derivatives of amines; isocyanates and other compounds capable of reacting with groups containing active hydrogen to yield, for example ureas, urethanes, allophanates and the like; nitroso or oxide compounds such as p-quinone dioxine, and other difunctional chemicals containing at least one group capable of adding across double bonds such as organo-silane hydrides. Compounds containing sulfur which react with double bonds to yield mono sulfide bridged crosslinks such as thiuram disulphide are also suitable. In many instances it may also be desired to add other materials to enhance the crosslinking effect such as, in the use of ionizing radiation or other free radical initiators, crosslinking coagents including but not limited to poly-unsaturated compounds.

Irradiation and peroxide crosslinking are preferred. Where ionizing radiation is used in general doses between 5 and 50 mrads will achieve the desired crosslinking density without excessively compromising the physical properties of the product. Where peroxides are used, in general between 1 and 10 percent based on the polymer may be used. Part of the peroxide may be replaced by coagents. We have also discovered that the degree of similarity between $T_s$ and the crosslinking temperature ($T_c$) will depend on the thermal history of the composition prior to crosslinking. It is advantageous to maintain the composition at the crosslinking temperature for a brief period prior to subjecting said composition to the crosslinking process. For the majority of compositions the time required may be as short as one half minute, but for polymers possessing significant amounts of high molecular weight material (high Mooney viscosity gums) a longer annealing period is required. Because of the shortness of the annealing period and although we do not wish to be bound to any particular theory, we believe that it serves to allow the polymer molecules to relax at their characteristic molecular relaxation rate into their preferred configurations at the crosslinking temperature. Thus $T_s$ most nearly approaches $T_c$ when the polymer molecules have been previously caused to assume an unstrained configuration at $T_c$ prior to crosslinking.

The aforesaid annealing is not related to the annealing of carbon black containing compositions which results in a diminution in the resistance of the composition for example in Smith-Johannsen U.S. Pat. No. 3,861,029, which process is believed to result in the "structuring" of the carbon black dispersion, i.e. the formation of preferred conductive pathways. Thus annealing for structuring takes much longer than the relaxation annealing referred to hereinabove. We do find, however, that it is also advantageous to facilitate the structuring of the carbon black by annealing. When the desired crosslinking temperature is above about 170° C., it is often convenient to combine the two annealing steps and hold the composition in its final shaped form at $T_c$ for a sufficient period of time to cause the desired structuring to occur prior to crosslinking the composition. Thus, a ten to twenty minute anneal at 200° C. prior to crosslinking at that temperature is suitable. The time required for structuring is found to increase rapidly as the annealing temperature is decreased and for compositions which it is desired to crosslink at temperatures significantly below 200° C. it may be preferred to anneal at 200° C. for a short period to reduce the resistance of the composition, optionally cool to room temperature and subsequently hold the composition at $T_c$ for a sufficient time prior to crosslinking to relax the polymer molecules at $T_c$. Those skilled in the art will recognize that relaxation times for polymers vary widely with molecular weight and temperature (inter alia) and whilst in some circumstances compositions would relax almost instantaneously at $T_c$, in other circumstances a period of some minutes may be required to relax the molecules.

Moreover, it is possible by the use of plasticizers or other internal viscosity reducers to greatly reduce or even eliminate the relaxation anneal and in many circumstances to reduce the structuring anneal as well. Thus, the optional use of such plasticizers is contemplated in the instant invention. We prefer to use additives which can be polymerized or crosslinked into the polymer or which by some other means have their viscosity reducing effect neutralized after the $T_c$ anneal as such additives can have a deleterious effect on the resistance stability of polymeric PTC heaters under service conditions. Plasticising additives are particularly useful when peroxide or any of the other thermally activated crosslinking processes are used, as it is not possible conveniently to structure anneal the composition. The peroxide or curing agent when used are often good viscosity reducers fo the polymer and other plasticizers may also be used to advantage.

The density of crosslinking if above a certain minimum level, does not have a substantial effect on the $T_s$ of the composition. However, the slope of the resistance temperature relation above $T_s$ is a strong function of the crosslinking density; the higher said density the steeper the slope. Thus, the optimum crosslinking level is that which will achieve the desired resistance-temperature slope without undesirably compromising the physical properties of the product. As briefly noted above, especially with polymer compositions which do not crosslink readily using ionizing radiation or chemical free radical generating addives such as peroxides it is advantageous to add crosslinking promotors (or "coagents" to use a term known in the art). Such materials are usually unsaturated monomers.

Suitable unsaturated monomers (or mixtures of monomers) generally contain at least two ethylenic double bonds in each molecule and preferably contain at least three. They should of course preferably be compatible with the polymer and have low volatility under the process conditions. Examples of such monomers include allyl esters of polycarboxylic acids and other acid moieties such as cyanuric acid, e.g., triallyl cyanurate and isocyanurate, diallyl aconitate, maleate and itaconate, and tetraallyl pyromellitate; bis and tris maleimides, e.g., N,N$^1$-ethylene- and N,N$^1$-m-phenylene-bis-maleimide; acrylic and methacrylic esters of polyhydric alcohols, e.g., dipentaerythritol hexamethacrylate, ethylene glycol dimethacrylate, 1,3-butylene glycol dimethacrylate and penta-erythritol tetramethacrylate; vinyl esters of polybasic acids, e.g. trivinyl cyanurate and citrate; vinyl and ether allyl ethers of polyhydric alcohols, e.g. the tetra-allyl and tetra-vinyl ethers of pentaerythritol; and bisacrylamides, e.g. N,N$^1$-methylene- and N,N$^1$-p-phenylene-bis-acrylamide.

The amount of monomer required to provide a useful amount of crosslinking (as compared to a composition which is the same except for the presence of the monomer and has been processed in the same way) depends upon the particular monomer and the other ingredients, but can readily be determined by those skilled in the art having regard to the disclosure herein. Amounts within the range of 1 to 10% by weight of the composition, are generally satisfactory.

Other factors

As indicated above, the compositions of the invention may contain conventional ingredients such as antioxidants, flame retardants, inorganic fillers, thermal stabilisers, and processing aids. We have found that the presence of a non-conductive filler is often advantageous. Particularly is this so when the polymer is a silicone and the filler is silica. The presence of the non-conductive filler reduces the overall coefficient of expansion of the composition, and the improvement in PTC behavior is therefor surprising in view of the theory put forward by Kohler (see for example U.S. Pat. No. 3,243,753) which attributes the PTC effect to the difference between the thermal expansion ratios of the conductive filler and the composition.

The cross-linked compositions of the invention are useful as components of electrical devices comprising at least one electrode, and generally two or more electrodes, in contact therewith.

Thus the invention includes such devices, one example of which is a strip heater comprising
 (1) an elongate element of a cross-linked composition of the invention
 (2) at least two longitudinally extending electrodes embedded in said composition parallel to each other; and
 (3) an outer layer of a protective and insulating composition.

The electrodes are generally separated by 60 to 400 mils (0.15–1 cm) but greater separation, e.g. up to 1 inch (2.5 cm) or even more, is possible. The element can be of the conventional ribbon shape (i.e. an element whose cross-section is generally rectangular or dumbell-shaped) but preferably has a cross-section which is not more than 3 times, especially not more than 1.5 times, e.g. not more than 1.1 times, its smallest dimension, especially a round cross-section.

Such devices can for example, conveniently be made by extruding or molding the molten uncrosslinked conductive polymer composition over the electrode, and then cross-linking the composition while it is contact with the electrode.

The invention is illustrated by the following Examples in which percentages are by weight and temperatures are in °C. The Examples are summarised in Table 3 below.

Except where otherwise stated, in each Example, the indicated polymer and carbon black were blended on a 4 inch (10 cm) two roll mill to give a blend containing the indicated percentage of carbon black, and the blend pressed into a sheet 6×6×0.03 inch (15×15×0.075 cm.). Strips 1.5×1×0.03 inch (3.8×2.5×0.075 cm.) were cut from the sheet. Electrodes were created on opposite ends and opposite faces of the long dimension of each strip by painting thereon 0.25 inch (0.64 cm.) wide bands of silver paint. The strip was annealed for 10 minutes at 200° C. It was then placed on a metal plate maintained at the indicated temperature (±10° C.) and (when the plate temperature was greater than room temperature) was allowed to equilibrate with the plate, giving the polymer time to relax. The strip was then crosslinked, while maintaining the plate at the indicated temperature, by exposure to the indicated irradiation dose in Megarads from a 6 mA beam of about 0.7 MV electrons; the strip was thereby heated to a somewhat higher temperature, usually 10° to 20° C. higher at the higher dose. After cooling, the strip was heated slowly from room temperature to its peak temperature, measuring its resistance between the electrodes at 15° C. intervals. The resistances in the steepest portion of the resistance/temperature curve were fitted to an expression of the form $$\text{Ln } (R_T/R_o) = \alpha(T-T_o)$$

(where $R_T$ was the resistance at Temperature T and $R_o$ was the resistance at the temperature $T_o$ at the start of this portion of the curve), and $\alpha$ was calculated. For a curve having an $R_{14}$ greater than 2.5 and an $R_{30}$ greater than 6, $\alpha$ is at least about 0.6.

Details of the carbon blacks used in the Examples are given in Table 1 below. Details of the polymers used in the Examples are given in Table 2 below. Details of the Examples themselves are given in Table 3, which also gives the significant resistance/temperature characteristics of the products.

In Table 3, the polymers and carbon blacks are identified by their numbers as set out in Tables 1 and 2; the trade names of the polymers are also given and for the carbon blacks the particular size, nitrogen absorption and dibutyl phthalate absorption values are given in parentheses after the identification number. Comparative Examples not in accordance with the invention are marked with an asterisk (*).

TABLE 1

CARBON BLACKS

| Type No. | Trade Name | Industry Class | ASTM D1976-67 Class | Size Mu | $N_2$ $m^2/g$ | DBP cc/ 100 g |
|---|---|---|---|---|---|---|
| 1. | Black Pearls 900 | | N1 | 15 | 230 | 65 |
| 2. | Black Pearls 880 | | N1 | 16 | 220 | 110 |
| 3. | Regal 660 | | | 17 | 112 | 54 |
| 4. | Black Pearls 700 | | N1 | 18 | 200 | 122 |
| 5. | Vulcan 9H | SAF-HS | N166 | 11–19 | 142 | 135 |
| 6. | Vulcan 9 | SAF | N110 | 21 | 140 | 114 |
| 7. | Vulcan SC | SCF | N294 | 22 | 203 | 106 |
| 8. | Vulcan 5H | | N285 | 24 | 100 | 126 |
| 9. | Regal 330 | | | 25 | 94 | 70 |
| 10. | Regal 330R | | | 25 | 94 | 62 |
| 11. | Vulcan C | CF | N293 | 20–25 | 145 | 100 |
| 12. | Elftex 8 | | | 27 | 85 | 103 |
| 13. | Vulcan M | | N339 | 28 | 92 | 121 |
| 14. | Ketjen Black | | | 30 | 1000 | 340 |
| 15. | Vulcan XC-72 | XCF | N472 | 30 | 254 | 178 |
| 16. | Vulcan 3H | HAF-HS | N347 | 26–30 | 90 | 124 |
| 17. | Regal 99 | FF | N440 | 36 | 46 | 60 |
| 18. | Sterling S0 | FEF | N550 | 42 | 42 | 120 |
| 19. | Sterling S0-1 | FEF-LS | N539 | 42 | 42 | 109 |
| 20. | Sterling N765 | SRF-NS | N765 | 60 | 30 | 116 |
| 21. | Regal SRF-S | SRF-NS | | 60 | 30 | 64 |
| 22. | Sterling NS | SRF-HM-NS | N774 | 75 | 27 | 70 |

TABLE 2

POLYMERS

| Type No. | Trade Name | Polymer Type | Filler Type |
|---|---|---|---|
| 1. | Silastic 35U | Polydimethyl siloxane containing vinyl groups (0.4%) | Silica |
| 2. | SE 76 | Polydimethyl siloxane free from vinyl groups | None |
| 3. | Silastic 55U | Polydimethyl siloxane containing vinyl groups (0.4%) | Silica, in greater quantity than Silastic 35U |
| 4. | Silastic 410 | Polydimethyl siloxane having a high vinyl content (4%) | None |
| 5. | Silastic 437 | Polydimethyl siloxane containing vinyl groups (0.4%) | Silica |
| 6. | Viton B50 | Vinylidene difluoride copolymer | None |
| 7. | Nordel 1470 | Ethylene/propylene/diene terpolymer | None |
| 8. | Epsyn 5508 | Ethylene/propylene/diene terpolymer with high green strength | None |
| 9. | TPR 2000 | An ethylene/propylene rubber which contains about 20% polypropylene and has been lightly cross-linked under dynamic conditions so that it is a thermoplastic elastomer | None |
| 10. | Nysin 35-8 | An acrylonitrile/butadiene rubber containing 35% acrylonitrile | None |
| 11. | Natsyn 2200 | A cis-1,4-polyisoprene | None |

TABLE 3

| Examples | Polymer | Carbon Type | Black % | Radiation Dose | Curing Temp. °C | Resistance (Megohms) at 25° C. | Resistance (Megohms) at Peak | $T_s$ | $T_o$ | Peak Temp. | α | $R_{14}$ | $R_{30}$ | $R_{100}$ |
|---|---|---|---|---|---|---|---|---|---|---|---|---|---|---|
| 1. | 1. Silastic 35U | 14. (30/1000/340) | 5 | 20 | 25 | 0.8 | — | 23–45 | — | — | 0.048 | 2.0 | 4.0 | >10 |
| 2. | 1. Silastic 35U | | 5 | 50 | " | 2.0 | — | " | — | — | 0.058 | 2.3 | 5.2 | >10 |
| 3. | 1. Silastic 35U | | 8 | 20 | " | 0.01 | — | " | — | — | 0.018 | 1.3 | 2.3 | ~10 |
| 4. | 1. Silastic 35U | | 8 | 50 | " | 0.01 | — | " | 190 | >250 | 0.065 | 2.5 | 6.1 | >10 |
| 5. | 1. Silastic 35U | 16. (26–30/90/124) | 30 | 10 | " | — | — | " | — | — | 0.053 | 2.1 | 4.5 | >10 |
| 6. | 1. Silastic 35U | | | 20 | " | 0.01 | >20 | " | 70 | >110 | 0.096 | 3.8 | 13.3 | >100 |
| 7. | 1. Silastic 35U | | | 50 | " | 0.03 | >20 | " | 70 | >110 | 0.091 | 3.6 | 13.7 | >100 |
| 8.* | 1. Silastic 35U | 7. (22/203/106) | 25 | 20 | " | 0.004 | — | " | — | — | 0.028 | 1.5 | 2.4 | <10 |
| 9. | 1. Silastic 35U | | | 50 | " | 0.01 | >20 | " | 130 | >170 | 0.081 | 30.1 | 9.0 | >100 |
| 10. | 1. Silastic 35U | 12. (27/85/103) | 25 | 10 | " | 0.007 | >20 | " | 70 | >170 | 0.077 | 2.9 | 8.2 | >100 |
| 11. | 1. Silastic 35U | | | 20 | " | 0.02 | >20 | " | 70 | >115 | 0.134 | 6.5 | 34.4 | >1000 |
| 12. | 1. Silastic 35U | | | 50 | " | 0.1 | >20 | " | 70 | >90 | 0.091 | 5.8 | 27.5 | >1000 |
| 13. | 1. Silastic 35U | 19. (42/42/109) | 35 | 10 | " | 0.002 | >0.2 | " | 25 | >280 | 0.051 | 2.0 | 4.3 | >10 |
| 14. | 1. Silastic 35U | | | 20 | " | 0.005 | >10 | " | 25 | >190 | 0.091 | 3.6 | 11.6 | >100 |
| 15. | 1. Silastic 35U | | | 40 | " | 0.01 | >20 | " | 25 | >90 | 0.132 | 6.4 | 32.8 | >1000 |
| 16. | 1. Silastic 35U | | | 90 | " | 0.01 | >20 | " | 55 | >75 | 0.173 | 11.2 | 90.0 | >1000 |
| 17.* | 1. Silastic 35U | 9. (25/94/70) | 25 | 5 | " | 0.001 | — | " | 115 | — | 0.014 | 1.2 | 1.7 | <10 |
| 18. | 1. Silastic 35U | | | 10 | " | 0.002 | 0.2 | " | 100 | 235 | 0.057 | 2.2 | 5.1 | >10 |
| 19. | 1. Silastic 35U | | | 20 | " | 0.007 | >20 | " | 70 | >220 | 0.11 | 4.6 | 19.9 | >100 |
| 20. | 1. Silastic 35U | 10. (25/94/62) | 25 | 50 | " | 0.2 | 0.4 | " | 70 | >100 | 0.08 | 3.1 | 8.8 | >10 |
| 21. | 1. Silastic 35U | | | 10 | " | 0.03 | >20 | " | 70 | 220 | 0.031 | 1.6 | 2.6 | ~10 |
| 22. | 1. Silastic 35U | | | 20 | " | 0.1 | >20 | " | 85 | >130 | 0.082 | 3.2 | 9.4 | >100 |
| 23. | 1. Silastic 35U | 17. (36/46/60) | 35 | 50 | " | 0.3 | >20 | " | 70 | >100 | 0.07 | 2.7 | 7.0 | >10 |
| 24. | 1. Silastic 35U | | | 10 | " | 0.01 | >20 | " | 55 | >265 | 0.051 | 2.1 | 4.3 | >10 |
| 25. | 1. Silastic 35U | | | 20 | " | 0.1 | >20 | " | 85 | >110 | 0.112 | 4.8 | 19.8 | >1000 |
| 26. | 1. Silastic 35U | 21. (60/30/64) | 45 | 10 | " | — | — | " | — | — | 0.046 | 1.9 | 3.8 | >10 |
| 27. | 1. Silastic 35U | | | 20 | " | 0.05 | >20 | " | 40 | >70 | 0.19 | 14.3 | 139 | >1000 |
| 28. | 1. Silastic 35U | | | 50 | " | 0.1 | >20 | " | 40 | >60 | 0.11 | 4.7 | 19.3 | >1000 |
| 29. | 1. Silastic 35U | 20. (60/30/116) | 40 | 5 | " | 0.0004 | 1 | " | 115 | 250 | 0.085 | 3.3 | 10.0 | >100 |
| 30. | 1. Silastic 35U | | | 10 | " | 0.0004 | >20 | " | 100 | >220 | 0.150 | 8.2 | 51.6 | >1000 |
| 31. | 1. Silastic 35U | | | 20 | " | 0.0004 | >20 | " | 70 | >130 | 0.197 | 15.8 | 167 | >1000 |
| 32. | 1. Silastic 35U | | | 50 | " | 0.006 | >20 | " | 70 | >100 | 0.115 | 5.0 | 21.5 | >100 |
| 33.* | 1. Silastic 35U | 11. (20–25/145/100) | 25 | 20 | " | 0.07 | — | 23–65 | — | — | 0.03 | 1.5 | 2.1 | <10 |
| 34. | 1. Silastic 35U | | | 50 | " | 0.2 | >20 | " | 100 | >120 | 0.07 | 2.8 | 6.1 | >10 |
| 35. | 1. Silastic 35U | 6. (21/140/114) | 25 | 20 | " | 0.03 | — | " | — | — | 0.033 | 1.6 | 2.7 | ~10 |
| 36. | 1. Silastic 35U | | | 50 | " | 0.3 | >20 | " | 100 | >130 | 0.065 | 2.5 | 6.0 | >10 |
| 37. | 1. Silastic 35U | 8. (24/100/126) | 30 | 20 | " | 0.005 | — | " | — | — | 0.039 | 1.7 | 3.2 | >10 |
| 38. | 1. Silastic 35U | | | 50 | " | 0.04 | >20 | " | 70 | >115 | 0.087 | 3.4 | 10.6 | >100 |
| 39. | 1. Silastic 35U | 13. (28/92/121) | 30 | 20 | " | 0.005 | — | " | — | — | 0.040 | 1.8 | 3.3 | >10 |
| 40. | 1. Silastic 35U | | | 50 | " | 0.02 | >20 | " | 70 | >140 | 0.082 | 3.2 | 9.3 | >100 |
| 41. | 1. Silastic 35U | 22. (75/27/70) | 42 | 5 | " | 0.02 | 4 | " | 70 | >140 | 0.066 | 2.5 | 6.2 | >100 |
| 42. | 1. Silastic 35U | | | 10 | " | 0.03 | >20 | " | 55 | 185 | 0.079 | 3.0 | 8.7 | >100 |
| 43. | 1. Silastic 35U | | | 20 | " | 0.04 | >20 | " | 40 | >190 | 0.097 | 3.9 | 13.6 | >100 |
| 44. | 1. Silastic 35U | | | 50 | " | 0.1 | — | " | 40 | >100 | 0.097 | 3.9 | 13.4 | >100 |
| 45. | 1. Silastic 35U | 15. (30/254/178) | 20 | 20 | " | 0.02 | — | " | — | — | 0.048 | 1.9 | 3.9 | >10 |
| 46. | 1. Silastic 35U | | | 50 | " | 0.3 | >20 | " | 40 | >85 | 0.070 | 2.6 | 6.8 | >10 |
| 47.* | 1. Silastic 35U | 5. (11–19/142/135) | | 20 | " | 0.0007 | — | " | — | — | 0.017 | 1.3 | 1.8 | <10 |
| 48.* | 1. Silastic 35U | | | 50 | " | 0.002 | — | " | — | — | 0.045 | 1.9 | 3.7 | <0 |
| 49.* | 1. Silastic 35U | 3. | 25 | 50 | " | 0.001 | — | " | — | — | 0.027 | 1.5 | 2.4 | <10 |

TABLE 3-continued

| Examples | Polymer | Carbon Type | Black % | Radiation Dose | Curing Temp. °C. | Resistance (Megohms) at 25° C. | at Peak | $T_s$ | $T_o$ | Peak Temp. | α | $R_{14}$ | $R_{30}$ | $R_{100}$ |
|---|---|---|---|---|---|---|---|---|---|---|---|---|---|---|
| 50.* | 1. Silastic 35U | (17/112/54) 2. (16/220/110) | 24 | 50 | " | 0.02 | — | " | — | — | 0.019 | 1.3 | 1.9 | <10 |
| 51.* | 1. Silastic 35U | 1. (15/230/65) | 30 | 50 | " | 0.0006 | — | " | — | — | 0.007 | 1.1 | 1.4 | <10 |
| 52.* | 2. SE-76 | 14. (30/1000/340) | 8 | 5 | " | — | — | — | — | — | <0 | <1 | <1 | <10 |
| 53.* | " | 22. (75/27/70) | 45 | 20 | " | — | — | — | — | — | 0 | 1 | 1 | <10 |
| 54.* | " | | | 10 | " | — | — | — | — | — | 0.01 | 1.2 | 1.6 | <10 |
| 55. | " | | | 20 | " | — | — | — | — | — | 0.058 | 2.3 | 5.1 | <10 |
| 56. | " | | | 40 | " | — | — | — | — | — | 0.086 | 3.4 | 10.4 | >100 |
| 57.* | " | 9. (25/94/70) | 25 | 5 | " | — | — | — | — | — | 0.018 | 1.3 | 1.9 | <10 |
| 58. | " | | | 10 | " | 0.02 | — | — | — | — | 0.103 | 4.2 | 15.6 | >100 |
| 59. | " | | | 20 | " | 0.2 | — | — | — | — | 0.1 | — | 13.1 | >100 |
| 60.* | " | 10. (25/74/62) | | 20 | " | — | — | — | — | — | <0 | — | — | — |
| 61.* | 1. Silastic 35U | 15. (30/254/178) | 15 | 10 | " | — | — | — | — | — | <0 | — | — | — |
| 62.* | 3. Silastic 55U | 4. (18/200/122) | 20 | 20 | " | — | — | — | — | — | 0 | — | — | — |
| 63.* | | | | 12 | " | — | — | — | — | — | 0 | 0 | 0 | — |
| 64.* | 3. Silastic 55U | 4. (18/200/122) | 20 | 12 | " | 0.007 | Constant from 25 to 175° C. | 23–45 | 75 | >175 | 0.034 | — | — | 8 |
| 65. | 4. Silastic 410 | 18. (42/42/120) | 35 | 18 | " | 0.0012 | (0.09 at 175° C.) | ~40 | 70 | >190 | 0.14 | 7.5 | 29 | >100 |
| 66. | 5. Silastic 437 | 18. (42/42/120) | 35 | 18 | " | 0.0011 | (11 at 145° C.) | ~40 | 120 | >200 | 0.10 | 4.6 | 16.5 | >100 |
| 67. | 5. Silastic 437 | 15. (30/254/178) | 20 | 9 | 25 | 0.0016 | (11 at 130° C.) 15 | 25–40 | 130 | >220 | 0.065 | 2.8 | 7 | >10 |
| 68. | | | | | 100 | 0.0025 | 0.4 | ~130 | 145 | >220 | .060 | 2.5 | 6 | >10 |
| 69. | | | | | 160 | 0.0028 | ~0.02 | ~170 | 175 | >220 | .04 | 1.7 | 3.3 | >10 |
| 70.* | | | | | 200 | 0.0028 | ~0.006 | ~190 | 195 | >220 | .01 | 1.2 | 1.4 | <10 |
| 71. | 6. Viton B50 containing 2% triallyl isocyanurate | 15. (30/254/178) containing 2% CaO | 15 | 20 | 25 | 0.006 | ~15 | ~50 | 130 | >170 | 0.13 | 6.2 | 50 | 1000 |
| 72. | | | | | 100 | 0.0015 | 0.02 | ~130 | 145 | 250 | 0.054 | 2.1 | 5.1 | >10 |
| 73. | | | | | 150 | 0.0012 | — | ~165 | 175 | >250 | — | — | 2 | <10 |
| 74. | 6. Viton B50 containing 2% trimethylol propane trimethacrylate | 18. (42/42/120) | 25 | 20 | 25 | 4 × 10⁻⁵ | >1 | ~25 | 70 | >280 | 0.05 | 2.0 | 4.5 | 100 |
| 75. | | | | | 110 | 6 × 10⁻⁵ | 0.1 | ~75 | — | 220 | 0.085 | 3.3 | 13 | >100 |
| 76. | 5. Silastic 437 | 18. (42/42/120) | 35 | 9 | 25 | 0.0007 | 2 | ~25 | 85 | 270 | 0.046 | 1.9 | 4 | 77 |
| 77. | | | | | 100 | 0.0006 | 5 | ~110 | 160 | 280 | 0.073 | 2.8 | 9 | 400 |
| 78. | | | | | 150 | 0.0005 | ~0.1 | ~150 | 175 | 280 | 0.051 | 2.0 | 4.6 | 60 |
| 79. | | | | | 200 | 0.0004 | ~0.01 | ~195 | 205 | >280 | 0.037 | 1.7 | 3 | ~15 |
| 80. | 4. Silastic 410 | 18. (42/42/120) | 35 | 9 | 25 | 0.0008 | ~2 | ~25 | 100 | 280 | 0.084 | 3.3 | 12.7 | >100 |
| 81. | | | | | 100 | 0.0003 | >20 | ~110 | 160 | >280 | 0.096 | 3.8 | 3.8 | >100 |
| 82. | | | | | 150 | 0.0002 | >2 | 150 | 190 | >280 | 0.094 | 3.7 | 16.7 | >100 |
| 83. | | | | | 200 | 0.0001 | >0.2 | 200 | 235 | >280 | 0.069 | 2.6 | 8 | >100 |
| 84. | 4. Silastic 410 | 18. (42/42/120) | 35 | 18 | 25 | 0.001 | >20 | ~25 | 100 | — | 0.11 | 7.5 | 29 | >100 |
| 85. | | | | | 100 | 0.0003 | >20 | ~120 | 175 | >200 | 0.154 | 8.6 | 100 | >100 |
| 86. | | | | | 150 | 0.0001 | >20 | 160 | 220 | >280 | 0.146 | 7.7 | ~80 | >100 |

TABLE 3-continued

| Examples | Polymer | Carbon Type | Black % | Radiation Dose | Curing Temp. °C | Resistance (Megohms) at 25° C. | at Peak | $T_s$ | $T_o$ | Peak Temp. | α | $R_{14}$ | $R_{30}$ | $R_{100}$ |
|---|---|---|---|---|---|---|---|---|---|---|---|---|---|---|
| 87. | 2. SE-76 | 18. (42/42/120) | 35 | 40 | 200 | 0.0001 | >0.2 | 205 | 220 | >280 | 0.077 | 2.9 | 10 | >100 |
| 88. | | | | | 25 | 0.008 | >1000 | 70–100 | 130 | — | ~0.2 | ~18.0 | ~500 | >10000 |
| 89. | | | | | 100 | 0.0015 | 0.5 | 100 | 145 | 220 | 0.07 | 2.6 | 8 | >100 |
| 90. | | | | | 150 | 0.0009 | 0.1 | 160 | 175 | >280 | 0.046 | 1.9 | 4 | >10 |
| 91. | | | | | 200 | 0.00002 | — | 225 | 235 | >280 | 0.045 | 1.9 | — | >10 |
| 92. | 7. Nordel | 18. (42/42/120) | 30 | 20 | 25 | 0.003 | >1000 | 40 | 70 | ~160 | 0.23 | 25 | ~1000 | — |
| 93. | | | | | 100 | 0.0002 | 100 | 105 | 115 | 220 | 0.15 | 7.7 | 80 | >1000 |
| 94. | | | | 10 | 140 | 0.0001 | 3 | ~130 | 130 | 220 | 0.086 | 3.3 | 13 | >100 |
| 95. | | | | | 180 | 0.0001 | 0.3 | ~160 | 175 | >250 | 0.070 | 2.8 | 6.7 | >100 |
| 96. | 8. Epsyn 5508 | 18. (42/42/120) | 48 | 10 | 25 | 0.00004 | >10 | ~25 | 150 | ~200 | 0.089 | 3.5 | 14.3 | >1000 |
| 97. | | | " | 10 | 100 | 0.0001 | >10 | 30–100 | 160 | ~200 | 0.12 | 5.4 | 35.2 | >1000 |
| 98. | | | 45 | 10 | 100 | 0.0002 | 50 | 100 | 130 | 250 | 0.09 | 3.5 | 10 | ~100 |
| 99. | 8. Epsyn 5508 | | 45 | 20 | see note 140 | 0.0002 | 15 | 130 | 160 | 240 | 0.11 | 4.5 | 15 | >100 |
| 100. | | | 40 | See note | 185 | 0.1 | >1000 | ~140 | 150 | >200 | 0.167 | 10.4 | 150 | >1000 |
| 101. | 8. Epsyn 5508 | 18. (42/42/120) | 40 | See note | 185 | 0.065 | >10 | ~150 | 175 | >200 | 0.085 | 3.3 | 13 | >100 |
| 102. | 5. Silastic 437 (39.3%) and (33.7%) | | | | 185 & 25 | 0.09 | >10 | ~130 | 160 | >200 | 0.15 | 8 | 100 | >1000 |
| 103. | 5. Silastic 437 | 18. (42/42/120) | 35 | See note | 200 200 & 25 | ~0.0007 ~0.007 | >10 >10 | ~205 ~195 | 220 220 | >250 >250 | 0.085 0.085 | 3.3 3.3 | 13 13 | >100 >100 |
| 104. | | | | | | | | | | | | | | |
| 105. | | | | | 160 160 & 25 | ~0.005 ~0.005 | >10 >10 | ~150 ~110 | 175 175 | >250 >250 | 0.092 0.113 | 3.6 4.9 | 16 30 | >100 >100 |
| 106. | | | | | | | | | | | | | | |
| 107. | 5. Silastic 437 | 18. (42/42/120) | 45 | 18 | 25 | 0.005 | >10 | 25–45 | 40 | — | ~0.1 | ~4 | ~16 | >1000 |
| 108. | 9. TPR 2000 | 15. (30/254/178) | 30 | 12 | 180 | 0.001 | >0.01 | ~170 | 170 | >240 | — | — | — | >10 |
| 109. | 10. Nysin 35-8 | 15. (30/254/178) | 30 | 20 | 25 | 0.01 | ~10 | 25–40 | 70 | 145 | 0.09 | 3.5 | 15 | >100 |
| 110. | | | | | 140 | 0.002 | ~0.035 | 150 | 175 | 235 | 0.06 | 2.5 | 6 | 17 |
| 111. | | | | | 180 | 0.001 | 0.007 | 180 | 205 | 250 | 0.046 | 1.9 | 4 | <10 |
| 112. | 11. Narsyn | 18. 2200 (42/42/120) | 40 | 20 | 25 | 0.15 | 40 | ~25 | 55 | 130 | 0.065 | 2.5 | 7 | >100 |
| 113. | | | | | 100 | 0.017 | 2 | ~110 | 145 | 190 | 0.083 | 3.2 | 8 | 60 |
| 114. | with 0.05% antioxidant | | | | 150 | 0.010 | 2 | 150 | 175 | 220 | 0.083 | 3.2 | 8 | ~100 |
| 115. | | | | | 200 | 0.012 | 0.2 | ~175 | 175 | 210 | 0.054 | 2.1 | 5 | 12 |

NOTES ON TABLE 3

Examples 92–94

The Nordel-containing compositions were prepared in a Banbury mixer. Both the Nordel- and Epsyn-containing compositions were annealed at 200° C. for 5 minutes after they had been irradiated. The resistance of the second Nordel-containing composition, which had been irradiated at 100° C., decreased from 25° to 100° C.

Examples 97 and 98

Example 97 was irradiated within a few minutes of being placed on the hot plate and had a very indefinite $T_s$ in the range from 30°–100° C. Example 98 was allowed to equilibrate and relax longer before irradiation and had a more clearly marked $T_s$ at 100° C. Furthermore, the resistance of 98 was relatively constant from 40° to $T_s$ while that of 97 doubled in the 30° range from 25° to 70° C.

Examples 100, 101, and 102

The curable compositions also contained 2,5-dimethyl-2,5-di(t-butylperoxy)hexane (about 4.9% in Example 100 and about 4% in Examples 101 and 102) and an antioxidant (about 1% in Example 100 and about 0.5% in Examples 101 and 102). In Examples 100 and 101 the compositions were cured without irradiation by placing them for 20 minutes in a hydraulic press at 185° C. In Example 102 the composition was first cured in this way and then irradiated at 25° C. to a dosage of 12 Mrads. The resistance of the sample in Example 100 remained at about 0.1 megohm up to about 115° C. and then began to rise. The resistance of the sample in Example 101 dropped from about 0.065 Megohms at 25° C. to about 0.033 megohms at 85° C. and then began to rise. The resistance of the sample in Example 162 remained at about 0.09 megohms up to about 110° C. and then began to rise.

Examples 103 and 104

The curable composition also contained about 2% of 2,5-dimethyl-2,5-di(t-butylperoxy)hexyne-3. In Example 103, the composition was cured by heating to 200° C. In Example 104, the composition was cured by heating to 200° C., followed by irradiation at 25° C. to a dosage of 5 Mrads. The effect of the irradiation is to increase the (comparatively low) rate at which the resistance increases at temperatures below $T_s$.

Examples 105 and 106

The curable composition also contained about 2% of dicumyl peroxide (40% active). In Example 105 the composition was cured by heating at 160° C. In Example 106, the composition was cured by heating at 160° C. followed by irradiation at 25° C. to a dosage of 5 Mrads. The effect of irradiation is much more marked than in Example 104 and is greatly to increase the rate at which the resistance increases at temperatures below $T_s$, which becomes much more difficult to discern.

Example 108

The resistance/temperature curve of this Example showed no trace of the resistance peak at 155° C. which is seen when the same composition is irradiated to 12 Mrads at room temperature and which is associated with the melting of the polypropylene.

Similar results to those shown in the preceding Examples have been obtained with the following cross-linked polymers: chlorinated polyethylene, polyethyl acrylate chlorosulphonated polyethylene, plasticized and polyvinyl chloride.

In the accompanying drawings, FIG. 1 shows the resistance/temperature characteristics of the strips produced in Examples 67 to 70; FIG. 2 shows the resistance/temperature characteristics of the strips produced in Examples 103 and 104; and FIG. 3 shows the resistance/temperature characteristics of the strips produced in Examples 105, 106 and 107.

We claim:

1. A process for the preparation of a PTC composition which comprises
    (1) dispersing conductive particles having a size of at least 18 millimicrons in a polymer;
    (2) cross-linking the dispersion from step (1) at a first temperature ($T_{c1}$) and
    (3) further cross-linking the cross-linked composition from step (2) at a second temperature ($T_{c2}$) which is substantially different from $T_{c1}$ the composition obtained in step (3) having a gel fraction of at least 0.6; exhibiting PTC behavior with an $R_{14}$ value of at least 2.5 or a $R_{100}$ value of at least 10 and at least one $T_s$ within the temperature range of $-100$ to 250° C.; and having a volume resistivity at temperatures below $T_s$ of 25 to $10^5$ ohm·cm.

2. A process according to claim 1 wherein the polymer is a thermoplastic and $T_{c1}$ is substantially lower than $T_{c2}$.

3. A process according to claim 1 wherein the cross-linked polymer is an elastomer and $T_{c1}$ is substantially higher than $T_{c2}$.

4. A process according to claim 1 wherein the polymer is an elastomer gum.

5. A process according to claim 4 wherein the polymer is a polysiloxane.

6. A process according to claim 5 wherein the polysiloxane contains silica as a filler.

7. A process according to claim 1 wherein the polymer has a tensile stress of at least 10 psi at 20% elongation.

8. A process according to claim 1 wherein the polymer has a tensile stress of less than 10 psi at 20% elongation.

9. A process according to claim 7 wherein the polymer is annealed at each cross-linking temperature prior to cross-linking.

10. A process according to claim 1 wherein the polymer is cross-linked by irradiation.

11. A process according to claim 1 wherein the polymer is cross-linked with the aid of a chemical cross-linking agent.

12. A process according to claim 1 wherein at least one of the cross-linking temperatures is above 20° C. and the conductive filler is a carbon black having a particle size of at least 20 millimicrons.

13. A process according to claim 1 wherein at least one of the cross-linking temperatures is above 100° C. and the conductive filler is a carbon black having a particle size of at least 30 millimicrons.

14. A process according to claim 1 wherein at least one of the cross-linking temperatures is above 150° C. and the conductive filler is a carbon black having a particle size of at least 40 millimicrons.

15. A process for the preparation of a PTC composition which comprises:

(1) dispersing conductive particles having a size of at least 18 millimicrons in a crystalline polymer; and (2) cross-linking the dispersion from step (1) at a temperature above 60° C. by means of radiation to obtain a composition having a gel fraction of at least 0.6;

the particles, the polymer and the cross-linking conditions being such that the cross-linked composition exhibits PTC behavior with an $R_{14}$ value of at least 2.5 or an $R_{100}$ value of at least 10 and at least one $T_s$ within the range of $-100°$ C. to $+250°$ C., and has a volume resistivity at temperatures below $T_s$ of 25 to $10^5$ ohm·cm.

16. A process according to claim 15 wherein the cross-linked composition
    (a) exhibits PTC behavior with a first $T_s$ near the crystalline melting point of the polymer ($T_{s1}$) and a second $T_s$ near the temperature of the cross-linking step (2) ($T_{s2}$);
    (b) has a volume resistivity at temperatures below the lower of $T_{s1}$ and $T_{s2}$ between 25 and $10^5$ ohm·cm; and
    (c) has an $R_{14}$ value between $T_{s1}$ and $T_{s2}$ or above the higher of $T_{s1}$ and $T_{s2}$ of at least 2.5 or has an $R_{100}$ value between $T_{s1}$ and $T_{s2}$ or above the higher of $T_{s1}$ and $T_{s2}$ of at least 10.

17. A process according to claim 15 wherein the temperature of the dispersion in step (2) is above the $T_s$ of the composition prior to cross-linking.

18. A process according to claim 15 wherein the temperature of the dispersion in step (2) is above the crystalline melting point of the polymer.

19. A PTC composition comprising:
    (1) a cross-linked crystalline polymer; and
    (2) conductive particles enclosed within the cross-linked network of said polymer, the particles having a size of at least 18 millimicrons;
    which composition
    (a) has a gel fraction of at least 0.6;
    (b) exhibits PTC behavior in two distinct temperature ranges, each having an $R_{14}$ value of at least 2.5 or an $R_{100}$ value of at least 10, and a $T_s$ which is within the temperature range of $-100°$ to $+250°$ C. and the $T_s$ is one of the temperature ranges being above the $T_s$ of the composition prior to cross-linking; and
    (c) has a volume resistivity at a temperature below each $T_s$ of 25 to $10^5$ ohm·cm.

20. A PTC composition according to claim 19 whose $T_s$ remains substantially unchanged when repeatedly subjected to thermal cycling which comprises heating the composition from a temperature below $T_s$ to a temperature above $T_s$ but below the peak temperature, followed by cooling to a temperature below $T_s$.

21. A PTC composition according to claim 19 wherein the conductive particles are carbon black particles having a size of 22 to 80 millimicrons.

22. A PTC composition comprising:
    (1) an elastomer obtained by cross-linking a thermoplastic elastomer; and
    (2) conductive particles enclosed within the cross-linked network of said elastomer, the particles having a size of at least 18 millimicrons;
    which composition
    (a) has a gel fraction of at least 0.6;
    (b) exhibits PTC behavior with an $R_{14}$ value of at least 2.5 or an $R_{100}$ value of at least 10, and at least one $T_s$ which is within the temperature range of $-100°$ to 250° C.; and
    (c) has a volume resistivity at temperatures below said $T_s$ between 25 and $10^5$ ohm·cm.

23. A PTC composition according to claim 22 whose $T_s$ remains substantially unchanged when repeatedly subjected to thermal cycling which comprises heating the composition from a temperature below $T_s$ to a temperature above $T_s$ but below the peak temperature, followed by cooling to a temperature below $T_s$.

24. A PTC composition according to claim 22 wherein the conductive particles are carbon black particles having a size of 22 to 80 millimicrons.

25. A PTC composition comprising:
    (1) a cross-linked polymer which has been cross-linked by means of radiation; and
    (2) conductive particles enclosed within the cross-linked network of said polymer, the particles having a size of at least 18 millimicrons;
    which composition
    (a) has a gel fraction of at least 0.6;
    (b) exhibits PTC behavior with an $R_{14}$ value of at least 2.5 or an $R_{100}$ value of at least 10, and at least one $T_s$ which is within the temperature range of $-100°$ to 250° C., subject to the proviso that, in the case of a cross-linked crystalline polymer, the composition has a $T_s$ which is above the $T_s$ of the composition prior to cross-linking; and
    (c) has a volume resistivity at temperatures below said $T_s$ between 25 and $10^5$ ohm·cm.

26. A PTC composition according to claim 25 wherein the said cross-linked polymer is an elastomer.

27. A PTC composition according to claim 25 which exhibits PTC behavior in two distinct temperature ranges.

28. A PTC composition according to claim 25 whose $T_s$ remains substantially unchanged when repeatedly subjected to thermal cycling which comprises heating the composition from a temperature below $T_s$ to a temperature above $T_s$ but below the peak temperature, followed by cooling to a temperature below $T_s$.

29. A PTC composition according to claim 25 wherein the conductive particles are carbon black particles having a size of 22 to 80 millimicrons.

30. A PTC composition according to claim 29 wherein the cross-linked polymer is an elastomer and the composition further comprises non-conductive particles enclosed with the cross-linked network of the polymer.

31. A PTC composition according to claim 30 wherein the polymer is a polysiloxane and the non-conductive filler is silica.

32. A PTC composition according to claim 26 wherein the elastomer is a polysiloxane and the conductive filler is a carbon black selected from the gruop consisting of furnace blacks, thermal blacks and channel blacks.

33. A PTC composition according to claim 25 wherein the cross-linked polymer contains less than 5% carbon-carbon unsaturation.

34. A PTC composition according to claim 25 wherein the polymer is a cross-linked thermoplastic elastomer.

35. A method for the preparation of a PTC composition which comprises:
    (1) dispersing conductive particles having a size of at least 18 millimicrons in a polymer which comprises an amorphous polymer having a tensile stress of at least 10 psi at 20% elongation;

(2) heating the dispersion from step (1) to an elevated temperature;

(3) maintaining the dispersion at the elevated temperature for a time such that the amorphous polymer molecules assume a substantially unstrained configuration; and (4) cross-linking the equilibrated dispersion from step (3) to obtain a composition which has a gel fraction of at least 0.6 and which comprises the conductive particles enclosed within a cross-linked network of the amorphous polymer;

the particles, the polymer, and the cross-linking conditions being such that the cross-linked composition (a) exhibits PTC behavior with an $R_{14}$ value of at least 2.5 or an $R_{100}$ value of at least 10, and at least one $T_s$ within the temperature range of $-100°$ C. to $+250°$ C.; and (b) has a volume resistivity at a temperature below $T_s$ of 25 to $10^5$ ohm·cm.

36. A method according to claim 35 wherein the polymer is an elastomer gum.

37. A method according to claim 35 wherein the polymer is maintained at the elevated temperature for at least 0.5 minute prior to cross-linking.

38. A method according to claim 35 wherein the polymer is cross-linked by irradiation.

39. A method according to claim 35 wherein the polymer is cross-linked with the adi of a chemical cross-linking agent.

40. A method according to claim 35 wherein the conductive filler is a carbon black having a particle size of at least 20 millimicrons.

41. A method according to claim 35 wherein the elevated temperature is above 100° C. and the conductive filler is a carbon black having a particle size of at least 30 millimicrons.

42. A method according to claim 35 wherein the elevated temperature is above 150° C. and the conductive filler is a carbon black having a particle size of at least 40 millimicrons.

43. A method according to claim 35 wherein the conductive filler is a metal powder.

* * * * *